United States Patent Office 3,009,354
Patented Nov. 21, 1961

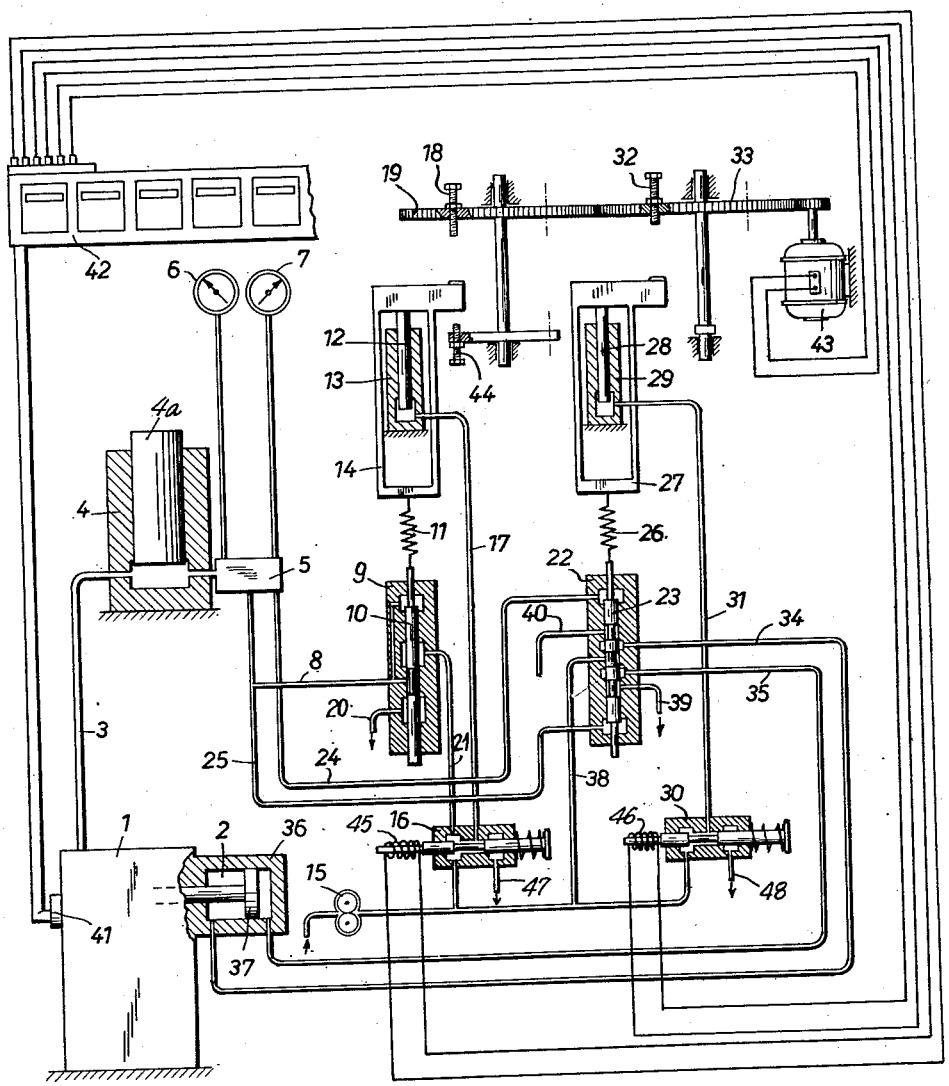

3,009,354
PROGRAM CONTROL OF HYDRAULICALLY OPERATED ENDURANCE TESTING MACHINES
Otto Schwaninger, Schaffhausen, Switzerland, assignor to Alfred J. Amsler & Co., Schaffhausen, Switzerland
Filed Dec. 6, 1957, Ser. No. 701,179
Claims priority, application Switzerland Dec. 7, 1956
6 Claims. (Cl. 73—90)

This invention relates to a method for the programming of hydraulically operated endurance testing machines. The invention also relates to program control apparatus for carrying out this method. Endurance tests are made to determine the mechanical properties of materials or machine parts exposed to continuous vibrations or to frequently repeated stress.

The test is usually made with a constant load amplitude and a constant mean load, i.e. the limits of the applied load changes are maintained at the same values during the whole tests.

In practice, for example in aircraft, automobiles and in other machines, dynamic stress caused by vibrations occurs more or less frequently and at different magnitudes.

To imitate this kind of straining it has been necessary to carry out the endurance tests according to a certain program, i.e. to change the mean load and the load amplitude step by step or continuously.

For performing such endurance tests, mechanically or electro-magnetically operated testing machines are already known; for hydraulically operated testing machines of this kind, however, no satisfactory construction has yet been proposed.

In the following specification the term program step means a certain number of load changes, during which the mean load and the load amplitude remain constant. The program is composed of a number of successive program steps; in such a program the mean load and the load amplitudes of the various separate program steps may be different. A program step can also consist of a small number of relatively slow load changes within two limits.

According to the invention, the method for programming of hydraulically operated endurance testing machines having a pulsator with hydraulic stroke adjusting means consists in comparing instantaneous values of the load applied to the work piece to be tested with separately generated reference forces at two different moments corresponding to two different phase positions whereby the resulting load differences control the two instantaneous load values so that at the moment of comparing they become equal to the two reference forces, and then, after a predetermined number of load changes, reversing to another program step having other reference forces. The invention is more fully explained with reference to the accompanying drawing which shows by way of example and diagrammatically an endurance testing apparatus according to this invention.

A pulsator 1 equipped with hydraulic stroke and adjusting means 2 is connected by a conduit 3 to one or more working cylinders 4 of the testing machine. Such a pulsator may be of the type described in Swiss Patent No. 304,760, dated January 31, 1955, or may be as described in E. Siebel: Handbuch der Merkstoffprufung, Erster Band, Pruf- und Messeinrichtungen, Spring-Verlag, Berlin, 1st edition, 1940, pages 256–261 or 2nd edition, 1958, pages 178–183. This working cylinder 4 can be of the usual design as used on hydraulic testing machines. It may also be a pressure vessel such as is used for the testing of work pieces or other purposes.

The pressure generated in the hydraulic medium, such as oil, changes periodically and is transformed by the piston 4a of the working cylinder 4 into a corresponding variable force transmitted to the work piece to be tested. The oil pressure diagram will show a curve having the form of a sine wave. Connected to the working cylinder 4 is a conventional measuring and distributing device 5. Manometers 6 and 7 connected to the device 5 allow measurement of the two characteristic values of the generated load, preferably the mean load and the peak load. It is known that any pair of values is sufficient to determine a sine curve when the duration of the period is given.

A pressure corresponding to the mean load is transmitted through control means within the distributor 5, e.g. through a rotary slide valve 9. This pressure acts on the piston 10 and generates a force which is effective in opposition to the force of a spring 11. The spring 11 is tensioned by a bracket 14, on which acts the piston 12 of a cylinder 13. The piston 12 is subjected to oil pressure supplied by a pump 15 through a control valve 16 and a conduit 17 into the cylinder 13. The pull of the spring 11, used as a reference force, is adjusted by a limit stop 18 mounted on the gear 19. There are as many limit stops on the gear 19 as there are program steps.

When the frame 14 abuts against the limit stop 18, the mean load is kept at a constant value by the piston 10. When the pressure corresponding to the mean load becomes too high in the working cylinder 4, the piston 10 moves downwardly and oil will be discharged through the tube 20. When the pressure in the cylinder 4 is too low, it does not develop a sufficient force to keep the piston 10 in the position as indicated in the drawing, and the pull of the spring 11 moves the piston 10 upwards. Therefore oil can flow from the pump 15 through control valve 16, conduit 21, slide valve 9, conduit tube 8 and distributor 5 into the working cylinder 4.

The pressure amplitude and therefore also the load amplitude is kept constant by a slide valve 22. The piston 23 of this valve is subjected to both the peak pressure and the mean pressure of the working cylinder 4 acting in opposite directions. The peak pressure is applied from the working cylinder 4 through the distributor 5, and the tube 24 to the upper end of the piston 23, whereas the mean pressure is applied from the working cylinder 4 through the distributor 5 and the tube 25 to the lower end of the piston 23. The resultant force acting on the piston corresponds to the difference between peak load and mean load, i.e. the load amplitude, and counteracts the reference force produced by the pull of the spring 26. The spring 26 is mounted between the piston 23 and the bracket 27 and is tensioned by the piston 28 of a cylinder 29. Pressure oil necessary to do this is fed by the pump 15 through a control valve 30 and conduit 31. The pull of the spring 26 is adjusted by a limit stop 32 mounted on the gear 33. There are as many limit stops on the gear 33 as there are program steps.

When the bracket 27 abuts against the limit stop 32, the load amplitude is regulated as follows:

Conduits 34 and 35 connect the control valve 22 to opposite ends of the stroke adjusting cylinder 36 of the pulsator 1 containing piston 37.

When the peak load is smaller than the desired value adjusted by the limit stop 32, the pull of the spring will be strong enough to move the piston 23 upwardly. Therefore oil can flow from the pump 15 through the conduit 38, the slide-valve 22 and the conduit 34 to left side of the stroke adjusting cylinder 36, so that the piston 37 is moved to the right. At the same time the oil displaced by the piston 37 can escape through conduit 35, slide valve 22 and the discharge tube 39.

By moving the piston 37 to the right, the stroke of the pulsator 1 is increased, so that the peak load is also increased, and the piston 23 is moved downwardly until equilibrium is obtained.

When the peak load is too high, the piston 23 is moved downwards against the pull of the spring 26 and the slide valve 22 allows oil to flow from the pump 15 through conduit 38, the slide valve 22 and conduit 35 to the right end of the cylinder 36. The piston 37 therefore moves to the left, and the oil displaced by the piston 37 escapes through the tube 34, the slide valve 22 and the tube 40.

By moving the piston 37 to the left, the stroke of the pulsator is decreased, so that the peak load is also decreased, and the piston 23 is moved upwardly until equilibrium is reached.

A test program is carried out as follows:

For every program step the mean load has to be adjusted by a limit stop 18, and the load amplitude by a limit stop 32. An impulse generator 41 is controlled by the pulsator 1 which, at every load change, furnishes an impulse to a set of counters 42. For every program step there is one counter which can be pre-set for the number of load changes wanted on a particular program step.

At the beginning of a program step, the particular limit stops 18 and 32 are brought into operating position by an electric motor 43 which is operated in response to the particular counter 42 for that program step. By the action of the oil pressure generated by the pump 15, the brackets 14 and 27 are moved towards the limit stops 18 and 32, so that the springs 11 and 26 are tensioned. The mean load and the peak load are adjusted as has been described above.

As soon as the number of load changes for which the counter was pre-set, has been reached, the control valves 16 and 30 are operated from the counter 42 for the particular program step, for example electro-magnetically by solenoids 45 and 46 so that the conduits 17 and 31 are connected with the discharge tubes 47 and 48, respectively, and pressure in the cylinders 13 and 29 drops, while springs 11 and 26 pull the brackets 14 and 27 downwardly.

A new program step begins when the motor 43 moves the control discs or gears 33 and 19 into a new position under the direction of the counter 42 for the new program step, so that other limit stops 18 and 32 set for this new program step, come into operating position. Then the cylinders 13 and 29 are again connected to the pump 15 by switching the control valves 16 and 30. The impulses from the impulse generator 41 are now switched automatically to the next succeeding counter of the set of counters 42.

In this way one program step follows the other until the test is completed.

It is possible to provide for one program step only a small number of nearly-static load changes, or only a single one, between two loads limits. For this purpose, the particular counter of the set of counters 42 is adjusted for the number of load changes, and the limit stop 32 pertaining to this particular program step is set for a load amplitude of zero. The desired upper load limit is set by the limit stop 18 and the lower load limit is set by the limit stop 44.

Upon switching to such a program step the load amplitude will be zero, i.e. the pulsator operates with a piston and an oil delivery equal to zero.

The pump 15 supplies oil through the control valve 16, conduit 21, the slide valve 9, conduit 8, the distributor 5 into the working cylinder 4, and also through the control valve 16 and conduit 17 into the cylinder 13. Therefore the piston 12 and the bracket 14 are moved and the bracket 14 is raised until it abuts against the limit stop 18, and also the pressure in cylinder 4 increases to peak value determined by the limit stop 18. When this limit stop 18 is reached by the bracket 14, the control valve 16 is reversed. The bracket moves downwardly under the action of the spring 11. The oil escapes from the cylinder 13 and also from the working cylinder 4 through the same paths as it was conducted to them, except that it flows out through the discharge tube 47. The minimum load is reached when the bracket 14 abuts against the limit stop 44. Then the control valve 16 is switched back again and the whole cycle is repeated as many times as prescribed by the setting of the counter. Afterwards, the next following program step may start.

It is thought that the invention and its advantages will be understood from the foregoing description and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

I claim:

1. In a hydraulically operated fatigue testing machine having a variable stroke pulsator with hydraulic stroke adjusting means and with a distributing device alternately furnishing hydraulic pressure corresponding to the peak load and the mean load on the specimen during each load cycle, the combination of an automatic program control device having means for preselecting the number of load cycles in each of a plurality of consecutive program steps, load preselecting means for preselecting the mean load and the pulsating load amplitude for each program step, mean load maintaining means connected to said distributing device and controlled by said load preselecting means for automatically maintaining the preselected mean load in the working cylinder by adding to or subtracting from the pulsating oil volume, pulsating load amplitude maintaining means connected to the hydraulic stroke adjusting means and controlled by said load preselecting means for automatically maintaining the preselected pulsating load amplitude by suitably adjusting the stroke of the pulsator, and changeover means connected to said load preselecting means and controlled by said program control device for automatically changing over from one program step to the next one upon completion of said one program step.

2. The combination as claimed in claim 1 in which said automatic program control device for preselecting the number of load cycles in each of a plurality of consecutive program steps includes an impulse generator driven by the pulsator and a plurality of separate counters, one for each program step, said counters being responsive to the generated impulses and connected to said impulse generator so that upon completion of the preset number of load cycles one counter is stopped while simultaneously the means for changing over from one program step to the next is actuated and the next counter for the next program step started.

3. The combination as claimed in claim 1 in which said load preselecting means comprises mean load preselecting means for preselecting the mean load for each program step, said mean load preselecting means comprising a control disc having one adjustable limit stop thereon for each program step, and said mean load maintaining means comprises a first hydraulic cylinder having a piston, a bracket on said piston engageable with said limited stop, a slide valve comprising a second hydraulic cylinder and piston, and having an exhaust port, said second piston being exposed to the mean pressure in the working cylinder of the testing machine, a tensile spring connecting said bracket to said second piston, a high pressure oil pump connected to the first cylinder for delivering pressure liquid thereto and through said slide valve to the working cylinder of the testing machine for delivering pressure liquid thereto, such that when said bracket abuts against said limit stop, the preselected mean pressure acting upon the piston actuating the slide valve just balances the force of the tensile spring and the slide valve stays closed, and for a decreased mean pressure the spring force overrides the piston force thereby opening the slide valve and admitting oil into the working cylinder for increasing the mean pressure, and when the mean pressure surpasses the preselected value the piston force overrides the spring force for opening the exhaust port in the slide valve and bleeding oil from the working cylinder in order to reduce the mean pressure, the working cylinder thus being maintained automatically and constantly and influenced only when its deviation from the preselected value needs readjusting.

4. The combination as claimed in claim 3 in which said load preselecting means comprises pulsating load amplitude preselecting means for preselecting and automatically maintaining the pulsating load amplitude, said pulsating load amplitude preselecting means comprising a control disc having a plurality of adjustable limit stops, one for each program step, and said pulsating load amplitude maintaining means comprises a first hydraulic cylinder having a piston therein, a bracket on said piston, a slide valve comprising a second hydraulic cylinder and piston, said second piston having two opposite working faces exposed to the mean pressure and the peak pressure respectively, a tensile spring connecting said bracket to said second piston, a high pressure oil pump connected to the first cylinder for delivering pressure liquid thereto and also connected through said slide valve to both sides of the hydraulic stroke adjusting means of the pulsator, such that when said bracket abuts against said limit stop, the difference of the preselected peak pressure and the preselected mean pressure to which the opposite faces of the slide valve actuating piston are exposed, result in a piston force which just balances the force of the tensile spring and the slide valve stays closed, and for a decreased peak pressure the spring force overrides the piston force thereby opening the slide valve and admitting oil into the hydraulic stroke adjusting means of the pulsator so as to clause an increase of the pulsator stroke and thereby an increase of the peak pressure, until said peak pressure surpasses the preselected value, and when the peak pressure is greater than the preselected value the piston force overrides the spring force and moves the slide valve for admitting oil into the hydraulic stroke adjusting means of the pulsator so as to cause a decrease of the pulsator stroke, the peak pressure thus being automatically maintained constant and influenced only when its deviation from the preselected value needs readjusting.

5. The combination as claimed in claim 4 in which said changeover means for automatically changing over from one program step to the next one comprises a servomotor actuated by one of said counters at the end of the preset number of load cycles in one program step and connected to said control discs of said load preselecting means by an amount sufficient to move said limit stops for the next program step into position, a first solenoid-operated slide valve connected to said second hydraulic cylinder of said mean load maintaining means and connected to said counter and actuated thereby at the end of the program step for bleeding hydraulic liquid from the said second hydraulic cylinder and for reclosing said solenoid operated slide valve after said piston reaches the end position, a second solenoid operated slide valve connected to the second cylinder of said load amplitude maintaining means and to said counter and actuated thereby at the end of the program step for bleeding hydraulic liquid from the said second hydraulic cylinder and for being reclosed after said piston reaches the end position, and means connected to said servomotor and actuated thereby for starting the counter of load cycles for the next program step.

6. The combination as claimed in claim 5 and means for control of program steps consisting of a relatively small number of slow load cycles between two load limits, said means comprising a further control disc connected to the control disc of said mean load preselecting means for rotation therewith and having limit stops thereon, and a limit stop in the control disc for the peak load preselecting means corresponding to zero stroke of the pulsator, whereby when the limit stop for zero stroke of the pulsator reduces the stroke of the pulsator to zero, the first solenoid-operated slide valve for said mean load maintaining means admits oil to the first cylinder of the mean load maintaining means and simultaneously to the working cylinder of the testing machine until the bracket of said mean load maintaining means abuts against the limit stop on the control disc for said mean load preselecting means, whereupon said solenoid-operated slide valve is reversed causing it to bleed oil from the second hydraulic cylinder of said mean load maintaining means and from the working cylinder of the testing machine and causing the pressure in the testing machine to decrease until the bracket abuts against the limit stop on said further control disc, whereupon the solenoid operated slide valve is reversed again causing the load to increase again, the number of repetitions of this cycle being determined by the setting of the counter for the program step.

References Cited in the file of this patent

UNITED STATES PATENTS

| | | |
|---|---|---|
| Re. 22,416 | Eksergian | Jan. 11, 1944 |
| 1,575,519 | Amsler | Mar. 2, 1926 |
| 2,411,451 | Demartini et al. | Nov. 19, 1946 |
| 2,648,978 | Breunich | Aug. 18, 1953 |